No. 874,126. PATENTED DEC. 17, 1907.
F. M. SMILEY.
DRAFT EQUALIZER.
APPLICATION FILED MAY 3, 1907.
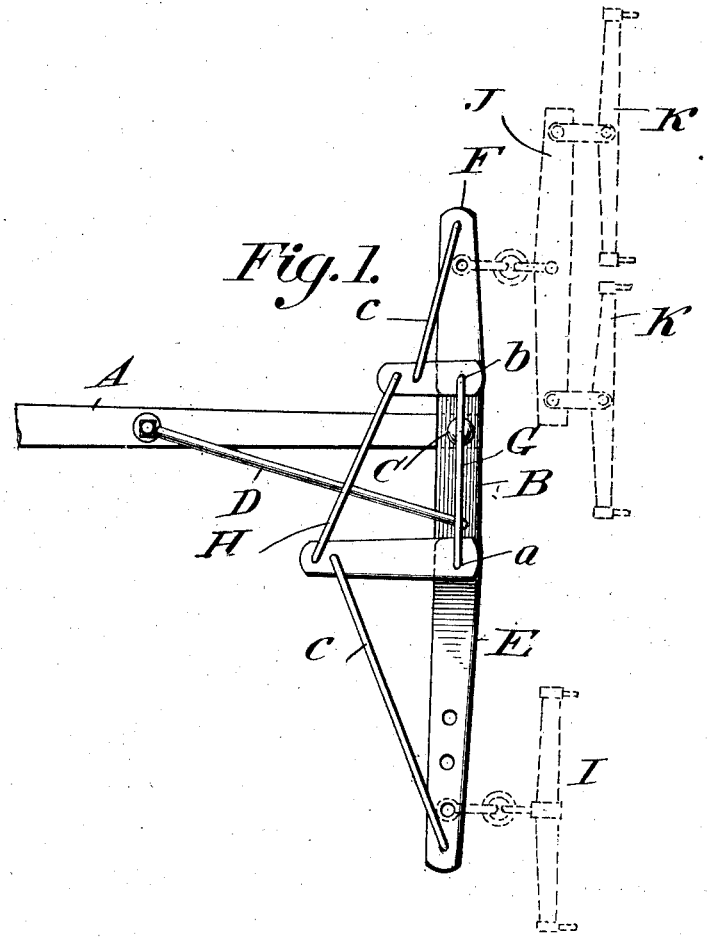
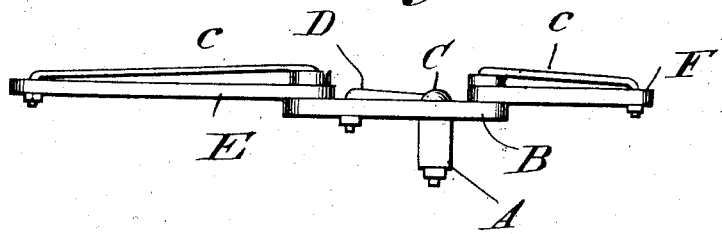

UNITED STATES PATENT OFFICE.

FRANKLIN M. SMILEY, OF GOSHEN, INDIANA.

DRAFT-EQUALIZER.

No. 874,126.  Specification of Letters Patent.  Patented Dec. 17, 1907.

Application filed May 3, 1907. Serial No. 371,644.

*To all whom it may concern:*

Be it known that I, FRANKLIN M. SMILEY, citizen of the United States, residing at Goshen, in the county of Elkhart and State of Indiana, have invented new and useful Improvements in Draft-Equalizers, of which the following is a specification.

My invention relates to draft equalizers, and consists in the peculiar and advantageous construction hereinafter described and claimed.

In the accompanying drawings: Figure 1 is a plan view illustrating the draft equalizer, and also illustrating by dotted lines trees as properly attached to the levers of the equalizer. Fig. 2 is a front elevation of the equalizer with the trees omitted.

Similar letters designate corresponding parts in both views of the drawings, referring to which:

A is a plow beam, and B is the body of my novel draft equalizer. The said body B is connected through the medium of a bolt C to the beam A, but is securely held against swinging movement on the beam by a metallic rod D which is connected at its rear end to the beam A and at its forward end to the body B.

E and F are the levers of the equalizer. These levers E and F are of the bell-crank type and are pivoted at $a$ and $b$, respectively, to the body B and each have an arm arranged substantially in line with the body B and an arm extending rearward at a right angle from the inner end of the first mentioned arm. The pivots of the said levers are preferably formed by the end portions of a metallic rod G which extends between and connects the two levers as shown in Fig. 1, so as to lend strength to the connection between the levers and also to the structure as a whole. Each of the levers is provided with a strengthening rod $c$ of metal which extends between the outer portions of its arms, and the rearwardly directed arms of the two levers are connected through the medium of a metallic rod H. It will also be observed particularly by reference to Fig. 1 that the lever E is considerably larger than the lever F, and from this it follows that the animal or animals pulling on the outwardly directed arm of the lever E are enabled to exert greater leverage than the animals pulling on the outwardly directed arm of the lever F, with the result that the draft is thoroughly equalized.

The lever E is shown as equipped with a swingletree I for the connection of a single draft animal, while the lever F is shown as equipped with a doubletree J bearing two swingletrees K for the connection of two draft animals, but I desire it understood that different numbers of draft animals may be connected to the levers without affecting the working of my improvements, and that the trees may be adjustably connected to the levers so that their positions relative to the levers may be changed as occasion demands.

The construction herein shown and described constitutes the preferred embodiment of my invention, but it is obvious that in practice such changes or modifications may be made as fairly fall within the scope of my invention as defined in the claims appended. For instance when the equalizer is employed on a plow, by employing two clevises, one at point C connecting the beam A with the rigid body B, and another connecting the stay D to the rigid body B, the equalizer works easily and permits of the plow being freely handled and retains every position that the solid connection would otherwise produce.

The equalizer arranged as just described is particularly advantageous when used on a plow and for four horses since it affords a straight draft on the plow at all times.

When the equalizer is used on a binder, heavy wagon or the like, the clevises mentioned are omitted and the device is used as shown.

Having described my invention, what I claim and desire to secure by Letters-Patent, is:

The herein described draft equalizer consisting essentially of a beam, a body connected at an intermediate point of its length with the beam, bell-crank levers having inner, rearwardly extending arms and outer, outwardly extending arms; one of the levers being larger than the other, a rod extending between and connecting the rearwardly extending arms of the bell-crank levers, a rod G extending lengthwise of the body and between the levers and having angular portions pivotally connecting the levers to the body; the said rod serving to connect the two bell crank levers and to lend strength to the same and the equalizer as a whole, and a stay rod connected at one end to the beam and at its opposite end to the body at a point intermediate the pivotal connections of the two bell crank levers.

In testimony whereof I have hereunto set my hand in presence of two subscribing witnesses.

FRANKLIN M. SMILEY.

Witnesses:
L. BURR WHIPPY,
BENJAMIN F. DEAHL.